US005746814A

United States Patent [19]

Malhotra et al.

[11] Patent Number: 5,746,814

[45] Date of Patent: May 5, 1998

[54] DECURLING COMPOSITIONS

[75] Inventors: Shadi L. Malhotra, Mississauga, Canada; Diane M. Foley, Palmyra, N.Y.

[73] Assignee: Xerox Corporation, Stamford, Conn.

[21] Appl. No.: 851,564

[22] Filed: May 7, 1997

[51] Int. Cl.[6] .............................. C09D 5/00; C09D 5/14; G03G 8/00

[52] U.S. Cl. .................... 106/18; 106/214.2; 106/206.1; 106/215.3; 106/215.5; 106/15.05; 106/18.32; 106/18.33; 106/18.34; 106/18.35; 106/150.1; 106/150.2; 106/153.1; 106/154.11; 106/155.21; 106/156.25; 106/156.5; 106/160.1; 106/170.44; 106/170.48; 106/172.1; 106/173.01; 106/177.1; 106/182.1; 106/185.1; 106/187.1; 106/191.1; 106/194.2; 106/209.1; 106/212.1; 106/170.1; 106/170.2; 106/168.1; 523/122; 524/106; 524/156; 524/199; 524/267; 524/315; 524/317; 524/386

[58] Field of Search .................................. 106/15.05, 18, 106/18.32, 18.33–18.35, 150.1, 150.2, 153.1, 154.11, 155.21, 156.25, 156.51, 160.1, 168.01, 170.1, 170.2, 170.44, 170.48, 172.1, 173.01, 177.1, 182.1, 185.1, 187.1, 191.1, 194.2, 209.1, 212.1, 214.2, 215.3, 215.5, 206.1; 523/122; 524/106, 156, 199, 267, 315, 317, 380; 430/104, 930

[56] References Cited

U.S. PATENT DOCUMENTS

| | | | |
|---|---|---|---|
| 4,254,732 | 3/1981 | Moser | 118/60 |
| 4,942,105 | 7/1990 | Yu | 430/59 |
| 5,218,411 | 6/1993 | Kosugiyama et al. | 355/285 |
| 5,314,747 | 5/1994 | Malhotra et al. | 428/341 |
| 5,320,902 | 6/1994 | Malhotra et al. | 428/342 |
| 5,354,813 | 10/1994 | Farooq et al. | 525/326.7 |
| 5,434,029 | 7/1995 | Moser | 430/97 |

*Primary Examiner*—David Brunsman
*Attorney, Agent, or Firm*—E. O. Palazzo

[57] ABSTRACT

Disclosed is a curl preventing/minimizing fluid composition containing a hydrophilic solvent, a polymeric binder, a water soluble/dispersible paper desizing agent, a water soluble/dispersible paper anticurl agent, a defoamer, a biocide, an antistatic agent, a lightfastness promoting agent, and a filler.

19 Claims, No Drawings

DECURLING COMPOSITIONS

PENDING APPLICATIONS

Illustrated in copending applications U.S. Ser. No. 08/852,553; U.S. Ser. No. 08/852,550; U.S. Ser. No. 08/852,555; and U.S. Ser. No. (not yet assigned-D/97024), the disclosures of which are totally incorporated herein by reference, are coated substrates and methods, recording sheets, coated xerographic photographic papers, and coated photographic papers, respectively.

BACKGROUND OF THE INVENTION

This invention relates generally to paper decurling fluid compositions that can be applied to imaged papers to prevent them from curling, or to minimize curling, and more specifically, the present invention is directed to the addition of curl preventing fluid compositions to imaged plain copy papers, recycled papers, coated papers, and papers selected for xerographic imaging, ink jet printing processes, gravure printing systems, and thermal transfer printing processes. In embodiments, the present invention relates to fluid compositions comprised of a water soluble/dispersible paper desizing agent, a water soluble/dispersible paper anticurl/decurling agent, a defoamer, a biocide, an antistatic agent, a lightfastness promoting agent, a filler, and a heat shrinkable polymeric binder that can be applied to at least one surface of an imaged paper, and more specifically, to two surfaces. In one embodiment, the present invention relates to adding fluid compositions comprised of a water soluble/dispersible a defoamer, a biocide, an antistatic agent, a lightfastness promoting agent, a filler, and an optional polymeric binder to at least one surface of a xerographically imaged paper immediately after it exits from the hot fuser thereby preventing, or minimizing curling. In embodiments, the fluid compositions are comprised of a mixture of (1) a polymeric binder, preferably a heat shrinkable polymeric binder, such as a polyamide, polypropylene, polyethylene or other similar component, (2) a paper desizing agent including hydrophilic poly(dimethylsiloxanes); poly(alkylene glycol), the derivatives thereof, such as poly(propylene glycol dimethacrylate), poly(ethylene glycol diacrylate), poly(propyleneoxide)-poly (ethyleneoxide) copolymers; quaternary alkosulfate compounds; fatty imidazolines, and the like, (3) a paper anticurl/decurling agent including hydrophilic trimethylolpropane, (Aldrich #23,974-7), trimethylol propane ethoxylate, (Aldrich #41,617-7), trimethylol propane triacrylate, (Aldrich #24,680-8), trimethylolpropane trimethacrylate, or (Aldrich #24,684-0), trimethylolpropane tris(2-methyl-1-aziridine propionate), or (Aldrich #40,544-2), neopentyl glycol ethoxylate, (Aldrich #41,027-6), (4) an antistatic agent such as quaternary acrylic copolymer latexes, such as HX-42-1, HX-42-3 available from Interpolymer Corporation; (5) a biocide such as 2-hydroxy propylmethane thiosulfonate (Busan 1005 available from Buckman Laboratories Inc.); methylene bis(thiocyanate) (Metasol T-10 available from Calgon Corporation); (6) a lightfastness inducing agent such as UV absorbing compounds including glycerol 4-amino benzoate, available as Escalol 106 from Van Dyk Corporation; hexadecyl-3,5-di-tert-butyl-4-hydroxy-benzoate, available as Cyasorb UV-2908, #41,320-8, from Aldrich Chemical Company; (7) a filler such as hydrated alumina (Hydrad TMC-HBF, Hydrad TM-HBC, available from J. M. Huber Corporation), or barium sulfate (K. C. Blanc Fix HD80 available from Kali Chemie Corporation), and (8) a defoamer alcohol compound such as behenyl alcohol, Aldol-60, stearyl alcohol, Aldol-61, and the like obtainable from Sherex Chemical Company.

PRIOR ART

In the process of xerography, a light image of an original to be copied is typically recorded in the form of a latent electrostatic image upon a photosensitive member with subsequent rendering of the latent image visible by the application of electroscopic marking particles, commonly referred to as toner. The visual toner image can be either fixed directly upon the photosensitive member or transferred from the member to another support, such as a sheet of plain paper, with subsequent affixing of the image thereto in one of various ways, for example as by heat and pressure. In order to affix or fuse electroscopic toner material onto a support member by heat and pressure, it is usually necessary to apply pressure and elevate the temperature of the toner to a point at which the constituents of the toner material become tacky and coalesce. This causes the toner to flow to some extent into the fibers or pores of the support members or otherwise upon the surface thereof. Thereafter, as the toner cools, solidification of the toner occurs causing the toner material to be bonded firmly to the support member such as paper.

One approach to heat and pressure fusing of electroscopic toner images onto a support has been to pass the support with the toner images thereon between a pair of opposed roller members, at least one of which is internally heated. During operation of a fusing system of this type, the support member to which the toner images are electrostatically adhered is moved through the nip formed between the rolls with the toner image contacting the fuser roll to effect heating of the toner images within the nip. A large quantity of heat is applied to the toner and the sheet bearing the toner image. This heat vaporizes the moisture contained in the sheet. Since the heat quantity applied to the front side of the sheet is not equal to that applied to the backside thereof, the amounts of water evaporated from the two sides of the sheet are not equal. This results in sheet curling. High toner mass area (TMA) copies, especially colored ones where large solids in excess of 2 milligrams/$cm^2$ are not uncommon, acquire a degree of curl that is usually unacceptable. With known decurling systems, decurling that is suitable in an area having a high TMA would result in too much decurling in an area where there is less toner coverage. This problem is generally recognized as continued expansion of paper as it equilibrates with the moisture in the environment after the toner image is set in its dimensions.

The type of paper, for example, whether the paper is coated, recycled, plain paper, highly calendered paper, and the like, used in the imaging process is very critical in obtaining the desired quality of images. Thus, it is important to understand as to how paper is made. A typical plain paper is generally comprised of blends of hard wood, such as hardwood kraft, and softwood, such as softwood kraft fibers which blends contain from about 10 percent to 90 percent by weight of soft wood, and from about 90 to about 10 percent by weight of hardwood. Examples of hardwood include Seagull W dry bleached hardwood kraft preferably present, for example, in some cases in an amount of 70 percent by weight. Examples of softwood include La Tuque dry bleached softwood kraft present, for example, in some cases in an amount of 30 percent by weight. In forming paper, the wood fibers are dispersed in a dilute aqueous slurry which is wet laid as a mat or web onto the screen of a conventional Fourdrinier-type machine. After the web has been dewatered, it is dried to a predetermined moisture level upstream of the size press. These plain papers may also contain fillers and pigments in effective amounts of from about 1 to about 60 percent by weight, such as clay (available from Georgia Kaolin Company, Astro-fil 90 clay, Engelhard Ansilex clay), titanium dioxide (available from Tioxide Company as Anatase grade AHR), calcium silicate CH-427-97-8, XP-974 (J. M. Huber Corporation), and the like. Also, the plain paper may contain various effective amounts of sizing chemicals (for example from about 0.25 percent to about 25 percent by weight of pulp), such as Mon size (available from Monsanto Company), Hercon-76 (available from Hercules Company), Alum available from Allied Chemicals as Iron free alum), and retention aids, like those available from Allied Colloids as Percol 292.

Paper is often sized with sizing components for the purpose of retarding or preventing penetration of liquids into the structure. This is commonly done by introducing the material into the pulp during the paper making operation. The acid sizing chemicals, such as Mon size available from Monsanto Chemical Company, or alkaline sizing chemicals, such as Hercon-76 available from Hercules Company, are precipitated onto the fibers primarily for the purpose of controlling penetration of liquids into the final dry paper. This process is known as internal sizing. Surface sizing involves the application of dispersions of film-forming substances such as converted starches, gums and modified polymers to previously formed paper. Surface sizing imparts strength to the paper and thus high quality printing papers are often surface sized as well. The sizing values of common plain papers, including the commercial papers that can be selected for the present invention in embodiments thereof, vary between about 0.4 second to about 4,685 seconds, however, papers in the sizing range of 50 seconds to 300 seconds are preferred, primarily to decrease costs. The porosity values of the substrates, which are preferably porous, varies from about 100 to about 1,260 mil/minute and preferably from about 100 to about 600 mil/minute to permit, for example, the use of these papers in various printing technologies such as thermal transfer, liquid toner development, xerography, ink jet processes, and the like. These internally and surface sized papers, when used in creating images or prints using nonphotographic imaging, such as xerography and/or ink jet printing and/or copying, produce curl.

Examples of curl prevention or decurling are illustrated, for example, in the following patents. U.S. Pat. No. 4,652,110 discloses an image forming or recording apparatus provided with an image fixing device of a heating type, which may cause curl of the recording material when the recording material is discharged from the fixing means. A device is provided which can effectively correct or remove the curl of the recording material, which includes a passage for applying post water vapor treatment to the recording material, immediately after it is discharged from the fixing device.

U.S. Pat. No. 5,218,411 discloses a sheet conveying device with curl reduction unit for a copier or a printer. The sheet conveying device includes a conveying path which guides the sheet on which the image has been fixed. The path has at least one curved portion. A changeable cooling device selectively cools the sheet guided along the conveying path. The fixing unit comprises a pair of rotating members for grasping and conveying the sheet. The conveying path comprises guiding members for guiding the sheet. The cooling unit comprises an openable and closable member which selectively opens and closes a passage for introducing air within the conveying path. The electrographic copier/printer discharges sheet of recording material with minimal curling.

U.S. Pat. No. 5,434,029 discloses a curl preventing apparatus and a post treatment method of preventing the curling of a substrate having toner images electrostatically adhered thereto which substrate has been subjected to heat for the purpose of fixing the toner images to the substrate. Simultaneously, constraint of the copy substrate and the application of moisture thereto is effected by passing the substrate through the nip formed by two pressure engaged rollers, one which is utilized for applying the water to the back side of the substrate as the substrate passes through the aforementioned nip.

According to some of the prior art, paper curl may be reduced somewhat by post treating the imaged plain papers with water and guiding these papers mechanically through pressure rolls prior to their exit from the copier. However, after formation of the hydrophobic toner image the amount of moisture uptake on plain papers by a combination of water and mechanical means is generally not sufficient. The continued expansion of the imaged paper, as it equilibrates with the moisture in the environment, demands more water to stay flat. This requires that in addition to the existing mechanical means of decurling papers the fluids used to rewet papers be supplemented with additives that can enhance the water absorption/retention in plain papers even after the hydrophobic toner has cast its mark.

Although the architecture of the xerographic machine and post treatment methods thereof for curl prevention or decurling as described in the above mentioned patents may be adequate, there remains a need for more efficient curl preventing fluid compositions. There remains a need for fluid compositions containing desizing/anticurl agents that reduce and eliminate paper curl due to the heat involved in the image fusion step. In addition, there remains a need for treated imaged papers wherein the fibers thereof are coated with block copolymers thereover enabling, for example, papers with images developed thereon have acceptable curl, high optical density values, and minimum showthrough. Also, there remains a need for treated imaged papers that permit the images with excellent toner adhesion, such as more than 95 percent, longer shelf life, scratch resistant images of high optical density. Additionally, there is a need for curl preventing fluid treatments which are compatible with the imaged plain copy papers, recycled papers, imaged filled papers, sized papers, and coated papers, which treatments will enable the aforementioned materials to generate low curl, high optical density images with electrophotographic processes utilizing, for example, liquid toners comprised of a toner resin, such as Elvax II, dispersed in a solvent, such as ISOPAR, and a charge director.

SUMMARY OF THE INVENTION

It is an object of the present invention to provide fluid compositions for imaged papers with many of the advantages illustrated herein.

Another object of the present invention resides in the provision of fluid compositions containing desizing and anticurl/decurling agents that reduce, minimize, or eliminate paper curl primarily caused by the heat involved in the image fusion step.

Also, in another object of the present invention there are provided treated imaged papers wherein the fibers thereof are coated with block copolymers thereover enabling, for example, papers with images developed thereon having acceptable curl, high optical density values, and minimum showthrough.

Another object of the present invention resides in treated imaged papers that permit images with excellent toner adhesion, such as more than 95 percent, longer shelf life, scratch resistant images of high optical density.

Furthermore, in another object of the present invention there are provided treated electrophotographic papers that do not undergo any bleeding of colors due to the fluid treatment.

Another object of the present invention relates to the application of the fluid compositions to ink jet papers which enables acceptable curl, and excellent water and lightfastness of the ink jet images.

In yet another object of the present invention there are provided compositions that are compatible with the imaged plain copy papers, recycled papers, imaged filled papers, sized papers, and coated papers, which compositions will enable low curl, high optical density images with electrophotographic processes utilizing, for example, liquid toners comprised of a toner resin, such as Elvax II, dispersed in a solvent, such as ISOPAR, and a charge director.

In yet another object of the present invention there are provided anticurl fluid compositions which are compatible with imaged plain copy papers, recycled papers, coated papers, filled papers and sized papers, and which compositions permit low or no paper curl, high optical density images with ink jet ink printing processes utilizing, for example, liquid inks comprised of an aqueous microwaveable liquid vehicle, a low surface tension penetrant solvent, a colorant dye and/or a pigment.

Embodiments of the present invention include, for example, a composition comprised of a hydrophilic solvent, a polymeric binder, a water soluble/dispersible paper desizing agent, a water soluble/dispersible paper anticurl agent, a defoamer, a biocide, an antistatic agent, a lightfastness promoting agent, and a filler; a fluid composition, which composition minimizes paper curl, wherein the water soluble/dispersible paper desizing agent is present in an amount of from about 0.1 percent by weight to about 20 percent by weight, the water soluble/dispersible paper anticurl agent is present in an amount of from about 0.1 percent by weight to about 20 percent by weight, the defoamer is present in an amount of from about 0.1 percent by weight to about 10 percent by weight, the biocide is present in an amount of from about 0.1 percent by weight to about 5 percent by weight, the antistatic agent is present in an amount of from about 0.1 percent by weight to about 15 percent by weight, the lightfastness promoting agent is present in an amount of from about 0.1 percent by weight to about 10 percent by weight, the filler is present in an amount of from about 0.1 percent by weight to about 4 percent by weight, the polymeric binder is present in an amount of from about 0.1 percent by weight to about 15 percent by weight, and water is present in an amount of from about 99.2 percent by weight to about 1 percent by weight; an anticurl composition applied to an imaged paper in a thickness of from about 0.5 micron to about 20 microns and wherein paper curling is minimized; and a process for minimizing curl which comprises applying to a substrate, such as paper, a composition for preventing or minimizing curl, and which composition is comprised of a hydrophilic solvent, a polymeric binder, a substantially water soluble paper desizing component, a substantially water soluble paper anticurl component, a defoamer, a biocide, an antistatic component, a lightfastness component, and a filler. The components, thickness, amounts of components, and the like are not limited to what is recited herein, and other components, thicknesses, amounts of components, and the like can be selected, it is believed.

In embodiments of the present invention, there are provided treated imaged papers, that is for example substrates, such as papers that contain developed images thereon, and wherein paper curl can be reduced by the invention fluid compositions comprised, for example, of a water soluble/dispersible, that is for example either soluble in water, or dispersible as a latex paper desizing agent, a water soluble/dispersible paper anticurl/decurling agent, a defoamer, a biocide, an antistatic agent, a lightfastness promoting agent, a filler, and an optional polymeric binder, that can be applied to at least one surface of a toner imaged paper after their image fusing process. The desizing component, or agent of the fluid composition, such as alkylene oxide-b-dimethyl siloxane copolymer, quaternary alkosulfate compounds, and the like, penetrate into the paper, lift the internal sizing from the fibers and rearrange the sizing material in the bulk of the paper thereby counterbalancing the changes in the mechanical properties of paper, such as paper stiffness caused by the loss of moisture in the heat induced fusing step. The anticurl agents of the fluid composition, which, for example, remoisturizes the paper almost instantaneously, coats the fibers of paper thereby rendering them substantially insensitive to moisture imbalance from the back and front side. The polymeric binder of the fluid composition can be heat shrinkable and this assists in reducing curl during the heating step. The rewetted paper when passed through hot pressure rollers has now reduced curl as determined, for example, holding the imaged paper with the thumb and forefinger in the middle of one of the long edges of the sheet (for example, in the middle of one of the 11 inch edges in an 8.5 by 11 inch sheet), and the arc formed by the sheet is matched against a pre-drawn standard template curve, for example template curves showing from about 5 millimeters to about 200 millimeters of curl. The post treatments of the imaged papers with the anticurl fluid compositions from aqueous/alcoholic solutions, followed by their passage through hot pressure rolls is also effective in reducing curl on imaged coated papers, recycled papers, and highly calendered liquid toner papers.

In one embodiment, the present invention relates to fluid compositions comprised of a water soluble/dispersible paper desizing agent, a water soluble/dispersible paper anticurl/decurling agent, a defoamer, a biocide, an antistatic agent, a lightfastness promoting agent, a filler, and an optional polymeric binder that can be applied to at least one surface of a liquid ink imaged paper. In one embodiment, the present invention relates to fluid compositions comprised of a water soluble/dispersible paper desizing agent, a water soluble/dispersible paper anticurl/decurling agent, a defoamer, a biocide, an antistatic agent, a lightfastness promoting agent, a filler, and an optional polymeric binder that can be applied to at least one surface of a xerographically imaged paper immediately after it exits from the hot fuser thereby preventing its curling. In embodiments, the fluid compositions of the present application are comprised of a mixture of (1) a polymeric binder, such as a polyester latex, styrene-alkyl acrylate latex, starch or other similar component, such as gelatin, (2) paper desizing agents, or components including hydrophilic poly(dimethyl siloxanes); poly(alkylene glycol), the derivatives thereof, poly(propylene oxide), poly (ethylene oxide) copolymers; fatty ester modified compounds of phosphate, sorbitan, glycerol, poly(ethylene glycol), sulfosuccinic acid, sulfonic acid, alkyl amine; poly (oxyalkylene) modified compounds of sorbitan esters, fatty amines, castor oil, fatty acid, fatty alcohol; quaternary alkosulfate compounds; fatty imidazolines, (3) a paper anticurl/decurling agent including hydrophilic trimethylolpropane (Aldrich #23974-7), trimethylolpropane ethoxylate (Aldrich #40,977-4; Aldrich #40,978-2; Aldrich #41,616-9;

Aldrich #41,617-7), trimethylolpropane triacrylate (Aldrich #24,680-8), trimethylolpropane trimethacrylate (Aldrich #24 684-0), trimethylolpropane ethoxylate triacrylate (Aldrich #41,217-1; #41,219-8), trimethylolpropane propoxylate triacrylate (Aldrich #40,756-9; #40,757-7), trimethylolpropane ethoxylate methylether diacrylate (Aldrich #40,587-1), trimethylolpropane tris(2-methyl-1-aziridine propionate) (Aldrich #40,544-2), neopentyl glycol ethoxylate (Aldrich #41,027-6), (4) an antistatic agent, such as quaternary acrylic copolymer latexes such as HX-42-1, HX-42-3, available from Interpolymer Corporation; ammonium quaternary salts as disclosed in U.S. Pat. No. 5,320, 902; (5) a biocide such as 2-hydroxypropylmethane thiosulfonate (Busan 1005 available from Buckman Laboratories Inc.); 2-(thio cyanomethyl thio) benzothiazole (Busan 30WB, 72WB, available from Buckman Laboratories Inc.); methylene bis(thiocyanate) (Metasol T-10 available from Calgon Corporation; (6) a lightfastness inducing agent, such as UV absorbing compounds including glycerol 4-amino benzoate, available as Escalol 106 from Van Dyk Corporation; resorcinol mono benzoate, available as RBM from Eastman Chemicals; octyl dimethyl amino benzoate, available as Escalol 507 from Van Dyk Corporation; hexadecyl-3,5-di-tert-butyl-4-hydroxybenzoate, available as Cyasorb UV-2908, #41,320-8, from Aldrich Chemical Company; (7) a filler such as hydrated alumina (Hydrad TMC-HBF, Hydrad TM-HBC, available from J. M. Huber Corporation), barium sulfate (K.C. Blanc Fix HD80 available from Kali Chemie Corporation), calcium carbonate (Microwhite Sylacauga Calcium Products), high brightness clays (such as Engelhard Paper Clays), calcium silicate (available from J. M. Huber Corporation), and (8) a defoamer such as alcohol compounds, such as behenyl alcohol, Aldol-60, stearyl alcohol, Aldol-61, isostearyl alcohol, Aldol-66, oleyl alcohol, Aldol-85, cetearyl alcohol, Aldol-640, from Sherex Chemical Company, dimethyl octynediol, Surfynol-82, dimethyl octynediol on silica, Surfynol-82S, tetramethyl decynediol, Surfynol-104, tetramethyl decynediol and 2-ethylhexanol, Surfynol-104A, tetramethyl decynediol and 2-butoxy ethanol, Surfynol-104BC, tetramethyl decynediol and 2-ethylene glycol, Surfynol-104E, tetramethyl decynediol and amorphous silica, Surfynol-104S, tetramethyl decynediol ethoxylated, Surfynol-440, acetylenic glycol, Surfynol-PC, acetylenic diol, or Surfynol-SE, all being available from Air Products Company.

The curl preventing fluid compositions can be applied to paper in a manner similar to that described in U.S. Pat. No. 5,434,029, the disclosure of which is totally incorporated herein by reference. A pair of rollers similar to a fuser, operating at significantly lower load and temperature are utilized for curl prevention. The roll that contacts the back side of the copy has a fluid composition applicator sump used in a manner similar to a donor roll RAM (Release Agent Management) system in roll fusers such as that shown in U.S. Pat. No. 4,254,732, the disclosure of which is totally incorporated herein by reference. A metering blade controls the amount of fluid composition applied to the back side of the copy. The amount of this fluid composition varies for example, from about 200 to about 250 milligrams to compensate for about the 150 milligram water loss encountered by a typical copy paper during the toner fusing process. In addition to application of fluid composition to the back side of the copy substrate, the fluid applying roll cooperates with the other roller to constrain the substrate while it is absorbing the fluid composition. Thus, the fluid composition can be applied to the substrate by the pressure of the pair of rollers.

Illustrative examples of commercially available, internally and externally (surface) sized imaged substrates that may be treated with the curl preventing fluid composition dispersed in an optional binder with a thickness of, for example, from about 50 microns to about 200 microns and preferably of a thickness of from about 100 microns to about 125 microns include Diazo papers, offset papers such as Great Lakes offset, recycled papers such as Conservatree, office papers such as Automimeo, Eddy liquid toner paper and copy papers from companies such as Nekoosa, Champion, Wiggins Teape, Kymmene, Modo, Domtar, and Veitsiluoto.

Specific examples of decurling agents that can be selected for the curl preventing fluid composition treatment or coating on a single side, or both sides thereof of papers include paper desizing agents (1) hydrophilic poly(dimethyl siloxanes), such as (a) poly(dimethyl siloxane) monocarbinol terminated (PS558, Petrarch Systems Inc.) and dicarbinol terminated (PS555, PS556, Petrarch Systems Inc.); (b) poly(dimethyl siloxane)-b-poly(methyl siloxane alkylene oxide) copolymers (PS073, PS072, PS071, Petrarch Systems Inc.), Alkasil HEP 182-280, Alkasil HEP 148-330, Alkaril Chemicals, nonhydrolyzable copolymers containing S1-C linkages; (c) poly(dimethyl siloxane)-b-poly(propylene oxide)-b-poly(ethylene oxide) copolymers (Alkasil NEP 73-70, Alkaril Chemicals), hydrolyzable copolymer containing S1—O—C linkages; (d) polyquaternary poly(dimethyl siloxane) copolymers (which can be obtained by the addition reaction of α,ω-hydrogen polysiloxane with epoxides containing olefinic bonds and then reacting the product with a diamine); (2) poly(alkylene glycol) and its derivatives (a) poly(propylene glycol) (Alkapol PPG-425, Alkapol PPG-4000, Alkaril Chemicals); (b) poly(propylene glycol dimethacrylate), poly(ethylene glycol diacrylate), poly(ethylene glycol dimethacrylate), poly(ethylene glycol monomethyl ether), poly(ethylene glycol dimethyl ether), poly(ethylene glycol diglycidyl ether) (all from Polysciences); (c) poly(1,4-oxybutylene glycol) (Scientific Polymer Products); (3) copolymers of liophilic poly(propylene oxide) with hydrophilic poly(ethylene oxide); (a) methanol soluble as Tetronic 150R1, Pluronic L-101, Tetronic 902, Tetronic 25R2 (BASF Corporation), Alkatronic EGE-1 (Alkaril Chemicals); (b) water soluble as Tetronic 908, 50R8, 25R8, 904, 90R4, Pluronic F-77 all from BASF Corporation, and Alkatronic EGE 25-2 and PGP 33-8 from Alkaril Chemicals; (4) fatty ester modifications of (a) phosphates (Alkaphos B6-56A, Alkaril Chemicals); (b) sorbitan (Alkamuls STO [sorbitan trioleate], Alkamuls SML [sorbitan mono laurate], Alkamuls SMO [sorbitan monooleate], Alkaril Chemicals); (c) glycerols (Alkamuls GMO-45LG [glyceryl mono oleate], Alkamuls GDO [glyceryl dioleate], Alkamuls GTO [glyceryl trioleate]); (d) poly(ethylene glycols) (Alkamuls 600 DO [di oleate], Alkamuls 400-ML [mono laurate], Alkamuls 600 MO [mono oleate], Alkamuls 600 DL [dilaurate], Alkamuls 600 DT [ditallow], Alkaril Chemicals; (e) sulfosuccinic acid (Alkasurf SS-O-75 [sodium dioctyl sulfosuccinate], Alkasurf SS-DA4-HE [ethoxylated alcohol sulfosuccinate], Alkasurf SS-L7DE [sodium sulfosuccinate ester of lauric diethanol amide], Alkasurf SS-L-HE (sodium lauryl sulfosuccinate], Alkaril Chemicals); (f) sulfonic acid (Alkasurf CA, [calcium dodecyl benzene sulfonate], Alkasurf 1 PAM [isopropylamine dodecyl benzene sulfonate], Alkaril Chemicals); (g) alkyl amines (Alkamide SDO [soya diethanol amide], Alkamide CDE [coco diethanol amide], Alkamide CME [coco monoethanol amide], Alkamide L9DE [lauric diethanol amide], Alkamide L7Me [lauric monoethanol amide], Alkamide L1PA [lauric monoisopropylamide], Alkaril Chemicals); (5) poly (oxyalkylene) modifications of (a) sorbitan esters (Alkamuls PSML-4 [poly(oxyethylene) sorbitan monolaurate], Alkamuls PSTO-20 [poly(oxyethylene) sorbitan monooleate], Alkamuls PSTO-20 [poly(oxyethylene) sorbitan trioleate], Alkaril Chemicals); (b) fatty amines (Alkaminox T-2, T-5 [tallow amine ethoxylate], Alkaminox SO-5 [soya amine ethoxylate], Alkaril Chemicals), (Icomeen T-2, Icomeen T-15, ICI Chemicals); (c) castor oil (Alkasurf CO-10 [caster oil ethoxylates], Alkaril Chemicals); (d) alkanol amide (Alkamide C-2, C-5 [coconut oil alkanolamide ethoxylates], Alkaril Chemicals); (e) fatty acid (Alkasurf 075-9, Alkasurf 0-10 [oleic acid ethoxylates], Alkasurf L-14 [lauric acid ethoxylate], Alkasurf P-7 [palmitic acid ethoxylate]); (f) fatty alcohol (Alkasurf LAN-1, LAN-3 Alkasurf TDA-6, Alkasurf SA-2, [linear alcohol ethoxylates], Alkasurf NP-1, NP-11 [nonyl phenol ethoxylates], Alkasurf OP-1, OP-12 [octyl phenol ethoxylates], Alkasurf LAEP-15, Alkasurf LAEP-25, Alkasurf LAEP-65 [linear alcohol alkoxylates]); (6) quaternary compounds (a) nonpolymeric quaternary ammonium ethosulfate (Finquat CT, Cordex AT-172, Finetex Corporation); (b) quaternary dialkyl dimethyl methosulfate (Alkaquat DHTS [hydrogenated tallow]); (c) alkoxylated difatty metho sulfate quaternary (Alkasurf DAET [tallow derivative]); (d) fatty imidazoline methosulfate quaternary (Alkaquat T [tallow derivatives], Alkaril Chemicals); (7) fatty imidazolines and their derivatives (a) Alkazine-O [oleic derivative]; (b) Alkazine TO [tail oil derivatives]; (c) Alkateric 2CIB (dicarboxylic cocoimidazoline sodium salt), Alkaril Chemicals; (d) Arzoline-4, (e) Arzoline-215, Baker Chemicals; and the like.

Specific examples of anticurl/decurling agents that can be selected for the curl preventing fluid composition treatment or coating on a single side, or both sides thereof of papers include paper anticurl agents, such as trimethylolpropane, (Aldrich #23,974-7), trimethylolpropane ethoxylate, (Aldrich #40,977-4; Aldrich #40,978-2; Aldrich #41,616-9; Aldrich #41,617-7), trimethylol propanetriacrylate, (Aldrich #24,680-8), trimethylolpropane-trimethacrylate (Aldrich #24,684-0), trimethylol propane ethoxylate triacrylate (Aldrich #41,217-1; #41,219-8) trimethylol propane propoxylate triacrylate (Aldrich #40,756-9; #40,757-7), trimethylolpropane ethoxylate methylether diacrylate (Aldrich #40,587-1), trimethylolpropane tris(2-methyl-1-aziridinepropionate) (Aldrich #40,544-2), neopentyl glycol ethoxylate (Aldrich #41,027-6), neopentyl glycol propoxylate (Aldrich #40,987-1; Aldrich #41,214-7), glycerol propoxylate (Aldrich #37,389-3; Aldrich #37,390-7; Aldrich #37,391-5; Aldrich #37,392-3; Aldrich #37,396-6; Aldrich #41,028-4), block copolymers of glycerol propoxylate with glycerol ethoxylate represented by glycerol propoxylate-b-glycerol ethoxylate, such as glycerol propoxylate-b-glycerol ethoxylate triol (Aldrich #37,386-9; Aldrich #37,387-7; Aldrich #37,388-5), glycerol ethoxylate-b-glycerol propoxylate triol (Aldrich #40,918-9), pentaerythritol ethoxylate (Aldrich #41,615-0; #41,873-0), pentaerythritol propoxylate (Aldrich #41,874-9; #41,875-7), pentaerythritol propoxylate/ethoxylate (Aldrich #42,502-8), triethanol amine ethoxylate (Aldrich #41,658-4), N-methyl diethanolamine (Aldrich #M4,220-3), N-ethyl diethanolamine (Aldrich #11,206-2), N-butyl diethanolamine (Aldrich #12, 425-7), N-phenyl diethanolamine (Aldrich #P2,240-0), triethanol amine (Aldrich #T5,830-0), trioctylamine (Aldrich #T8,100-0), 4-xylylene diamine (Aldrich #27,963-3), 1,4-bis(2-hydroxyethoxy)-2-butyne (Aldrich #B4,470-8), pantothenol (Aldrich #29,578-7), 1-phenyl-1, 2-ethanediol (Aldrich #30,215-5; #P2,405-5), 3-methoxy-1,2-propanediol (Aldrich #26,040-1), 3-allyloxy-1,2-propanediol (Aldrich #25,173-9), 3-ethoxy-1,2-propanediol (Aldrich #26,042-8), 3-phenoxy-1,2-propanediol (Aldrich #25,781-8), 3-octadecyloxy-1,2-propanediol (Aldrich #B40-2), 3-(4-methoxy phenoxy)-1,2-propanediol (Aldrich #21,024-2), mephensin[3-(2-methyl phenoxy)-1,2-propanediol] (Aldrich #28,656-7), 3-(diethylamino)-1,2-propanediol (Aldrich #21,849-9), 2-phenyl-1,2-propanediol (Aldrich #21,376-4), 3-amino-1,2-propanediol (Aldrich #A7,600-1), 3-(diisopropylamino)-1,2-propanediol (Aldrich #25,766-4), 3-(N-benzyl-N-methylamino)-1,2-propanediol (Aldrich #21,850-2), 3pyrrolidino-1,2-propanediol (Aldrich #21,851-0), 3-piperidino-1,2-propanediol (Aldrich #21,849-9), 3-morpholino-1,2-propanediol (Aldrich #21,848-0), 2,2-dimethyl-1-phenyl-1,3-propanediol (Aldrich #40,873-5), 2-benzyloxy-1,3-propanediol (Aldrich #36,744-3), 4-8bis (hydroxymethyl) tricyclo[5.2.1.02.6]decane (Aldrich #B4, 590-9), 1-[N,N-bis(2-hydroxyethyl)isopropanol amine (Aldrich #23,375-7), N,N-bis(2-hydroxypropyl) ethanolamine (Karl Industries), 1-[2-(2-hydroxyethoxy) ethyl]-piperazine (Aldrich #33,126-0), 1-4-bis(2-hydroxy ethyl)piperazine (Aldrich #B4,540-2), homovanillyl alcohol (Aldrich #14,883-0), phenethyl alcohol (Aldrich #P1,360-6), 3,6-dimethyl-4-octyne-3,6-diol (Aldrich #27,840-8), 2-(hydroxymethyl)-1,3-propanediol (Aldrich #39,365-7), 2-butyl-2-ethyl-1,3-propanediol (Aldrich #14,247-6), 2-piperidine methanol (Aldrich #15,522-5), 2,2,4-trimethyl-1,3-pentanediol (Aldrich #32,722-0), Vitamin E (Aldrich #25,802-4), Vitamin E acetate (Aldrich #24,817-7), Vitamin K (Aldrich #28,740-7), tri(ethylene glycol)dimethylacrylate (Aldrich #26,154-8), triethyl citrate (Aldrich #10,929-0) 2,4,7,9-tetramethyl-5-decyne-4,7-diol (Aldrich #27,838-6); and mixtures thereof.

Some of these paper anticurl/decurling agents and paper desizing agents can also act as antifoaming agents for the curl preventing fluid compositions.

Specific examples of antifoaming agents that can be selected for the curl preventing fluid composition treatment or coating on a single side, or both sides thereof of papers include (A) nonionic compounds, such as (a) silicone containing compounds such as silicone fluids available as Cru Fluid 350, Cru release 900 series from Crucible Chemical Company; silicone emulsions Kilofoam from Arol, Nalco 2300, Nalco Chemical Company, Mazu DF 100S, Mazu DF 200S, PPG-Mazer, Nilofoam 60, Nilofoam M, Nilofoam XC, Sandoz Chemical Company, Foam Master FLD, Henkel Corporation, Foam Burst, Ross Chemical Company, Dow Corning 1500, 1520, Y-30, H-10, Dow Corning, Foamex AD 50 from Lyndal, Defoamer S-10, S-100, Hart Products Corporation, Colloid 1010, Rhone-Poulenc Surfactant and Speciality Chemicals, Polymekon, Goldschmidt AG, Ridafoam-S-103-N, from PPG-Mazer, Sag Silicone Antifoam-10, -30 from Union Carbide; organo-silicone emulsions, such as Foamkill-30C, -30HP from Crucible Chemical Company, Sag Silicone antifoam-5300, -5310 from Union Carbide Chemical Company; polydimethyl siloxane, Akrochem SWS-201 from Akrochem Chemicals, L-45 series from Union Carbide Chemical Company, Antifoam SWS-201 from Wacker Silicones Corporation; silica filled polydimethyl siloxane, Sag Silicone Antifoam-100 from Union Carbide Chemical Company; hydrophobic silica, Rexfoam-150A from Graden; dimethicone, Viscasil from General Electric Company; silicone/polyalkylene glycol, Sag Silicone Antifoam-100 from Union Carbide Chemical Company; silicone glycol, Masil-2132, -2133, -2134, from PPG-Mazer; (b) amide containing compounds, such as behenamide, Kenamide-B; erucamide, Kenamide-E; oleamide, Kenamide-O; stearamide, Kenamide-S;

erucylerucamide, Kenamide-E-221; stearylerucamide, Kenamide-E-180; oleylpalmitamide, Kenamide-P-181; erucylstearamide, Kenamide-S-221; ethylenedioleamide, Kenamide-W-20; ethylenedistearamide, Kenamide-W-39; all available from Witco/Humko; acetylated-polyamide, Nalco-70, Nalco Chemical Company; hydrogenated tallow amide, Armid HT, Akzo Chemical Incorporated; (c) ester compounds, such as methyl oleate, Emerest 2301, Henkel and Emery; propyl oleate, Emerest 2302, Henkel and Emery; glyceryl oleate, Mazol 300, Mazol GMO, PPG-Mazer Chemical Company; glyceryl ricinoleate, Flexricin 13, Cas Chem; sorbitan oleate, Crill 4, sorbitan laurate, Crill 1, sorbitan palmitate, Crill 2, all available from Croda Chemicals; Lipo diglycol laurate, diethylene glycol mono stearate, Lipo DGS-SE, ethylene glycol stearate, Lipo EGMS, propylene glycol stearate, Lipo PGMS, ethylene glycol distearate, Lipo EGDS, all available from Lipo Chemicals; diethylene glycol mono laurate, Alkamuls DEG-ML, diethylene glycol dioleate, Alkamuls DEG-DO, Alkaril Chemicals, polyethylene glycol-4-oleate, Ethylan-A2, polyethylene glycol-6-oleate, Ethylan-A3, polyethylene glycol-8-oleate, Ethylan-A4, all available from Harcross, U.K; polyglyceryl-3-oleate, Caprol-3-GO, Capital City Product Company; polyethylene glycol-4-dioleate, Alkamuls 200-DO, Alkaril Chemicals, polyethylene glycol-8-dioleate, Lonzest PEG-4DO, Lonza Chemicals; polyethylene glycol-2-laurate SE, Lipo DGLS, available from Lipo Chemicals, polyethylene glycol-4-laurate, Emerest 2620, polyethylene glycol-8-laurate, Emerest 2650, available from Henkel and Emery, polyethylene glycol-12-laurate, Alkamuls-600-ML, Alkaril Chemicals; polyethyleneglycol-4-dilaurate, Alkamuls 200-DL, Alkaril Chemicals; polyethylene glycol-12-stearate, Alkamuls 600-MS, Alkaril Chemicals; polyethylene glycol-20-glycerol stearate, Aldo-MS-20-FG, Lonza Chemicals, esters of vegetable oil fatty acids, Kessco 3283, from Stepan; (d) ether compounds such as polyethyleneoxide/polypropyleneoxide block copolymers, Dow Corning 63N10, Dow Corning 63N20, from Dow Corning Company, ethylene oxide/propyleneoxide diamine compound, Lutensol ED-140, ED-310, ED-370, ED-610, from BASF A.G, Alkatronic EDP8-4, Alkaril Chemicals, linear alcohol ethoxylates such as nonoxynol-1, nonoxynol-4, nonoxynol-13, from DeSoto, polypropylene glycol, Alkapol PPG-1200, Alkapol PPG-2000, Alkapol PPG-4000, from Alkaril Chemicals, polyethylene glycol ethers, PEG-Castor oil, such as Alkasurf-CO-5, Alkasurf-CO-10, Alkasurf-CO-15, PEG-Laurate, such as Alkasurf-L-9, Alkasurf-L-14, PEG-nonyl oxynol, Alkasurf-NP-1, PEG-octo oxynol, Alkasurf-OP-12, Ikasurf-OP-16, all being available from Alkaril Chemicals, alcohol compounds, such as behenyl alcohol, Aldol-60, stearyl alcohol, Aldol-61, isostearyl alcohol, Aldol-66, oleyl alcohol, Aldol-85, cetearyl alcohol, Aldol-640, from Sherex Chemical Company, dimethyl octynediol, Surfynol-82, dimethyl octynediol on silica, Surfynol-82S, tetramethyl decynediol, Surfynol-104, tetramethyl decynediol and 2-ethylhexanol, Surfynol-104A, tetramethyl decynediol and 2-butoxy ethanol, Surfynol-104BC, tetramethyl decynediol and 2-ethylene glycol, Surfynol-104E, tetramethyl decynediol and amorphous silica, Surfynol-104S, tetramethyl decynediol ethoxylated, Surfynol-440, acetylenic glycol, Surfynol-PC, acetylenic diol, Surfynol-SE, all being available from Air Products Company; (B) cationic compounds, such as polyethylene glycol-2-oleammonium chloride, Ethoquad O/12, polyethylene glycol-15-oleammonium chloride, Ethoquad O/25, polyethylene glycol-2-stearmonium chloride and isopropanol, Ethoquad 18/12, polyethylene glycol-15-stearmonium chloride and isopropanol, Ethoquad 18/25, polyethylene glycol-2-cocomonium chloride, Ethoquad C/12, polyethyleneglycol-15-cocomonium chloride, Ethoquad C/25, all being available from Akzo Chemical Company, octadecyl diethanol methyl ammonium chloride, M-Quat-32, dicoco-dimoniumchloride and isopropanol, M-Quat-2475, PPG-Mazer, ethylhydroxyethyloleyloxazoline, Alkaterge, Angus Chemical Company, (C) anionic compounds, such as tributyl phosphate, TBP, from FMC Corporation, Pliabrac-TBP, Merrand, sulfonated oleic acid sodium salt, Sulfonate OA-5, Tennesse, linear alkyl aryl sodium sulfonate, Sulframin 40, Witco Chemicals, alcohol-ethoxylate-phosphate-ester acid form, Emphos P-415M, phenol ethoxylate phosphate ester acid form, Emphos TS-230, Witco Chemicals, iminopropionate partial sodium salt, Amphoteric 400, Exxon; and mixtures thereof.

Specific examples of binders polymers present in an amount of from about 0.1 percent by weight to about 15 percent by weight, and preferably from about 2 to about 10 percent by weight of the curl preventing fluid compositions within which the decurling agent can be dispersed or admixed, preferably hydrophilic film forming components, include (A) latex polymers (polymers capable of forming a latex is, for the purposes of the present invention, a polymer that forms in water or in an organic solvent a stable colloidal system in which the disperse phase is polymeric). Examples of suitable latex-forming polymers include polyamide latex such as PIOMIDE, available from Pioneer Plastics, polyalkylene waxes, such as paraffin wax emulsions Paracol 404C, 404G, 804A, available from Hercules Incorporated, rubber latex, such as neoprene available from Serva Biochemicals, polyester latex, such as Eastman AQ 29D available from Eastman Chemical Company, vinyl chloride latex, such as Geon 352 from B. F. Goodrich Chemical Group, ethylene-vinyl chloride copolymer emulsions, such as Airflex ethylene-vinyl chloride from Air Products and Chemicals, polyvinyl acetate homopolymer emulsions, such as Vinac from Air Products and Chemicals, carboxylated vinyl acetate emulsion resins, such as Synthemul synthetic resin emulsions 40-502, 40-503, and 97-664 from Reichhold Chemicals Inc., and Polyco 2149, 2150, and 2171 from Rohm and Haas Company, vinyl acetate copolymer latex, such as 76 RES 7800 from Union Oil Chemicals Divisions and Resyn 25-1103, Resyn 25-1109, Resyn 25-1119, and Resyn 25-1189 from National Starch and Chemical Corporation, ethylene-vinyl acetate copolymer emulsions, such as Airflex ethylene-vinylacetate from Air Products and Chemicals Inc., acrylic-vinyl acetate copolymer emulsions, such as Rhoplex AR-74 from Rohm and Haas Company, Synthemul 97-726 from Reichhold Chemicals Inc., Resyn 25-1140, 25-1141, 25-1142, and Resyn-6820 from National Starch and Chemical Corporation, vinyl acrylic terpolymer latex, such as 76 RES 3103 from Union Oil Chemical Division and Resyn 25-1110 from National Starch and Chemical Corporation, acrylic emulsion latex, such as Rhoplex B-15J, Rhoplex P-376, Rhoplex TR-407, Rhoplex E-940, Rhoplex TR-934, Rhoplex TR-520, Rhoplex HA-24, and Rhoplex NW-1825 from Rohm and Haas Company and Hycar 2600 X322, Hycar 2671, Hycar 2679, Hycar 26120, and Hycar 2600 X347 from B. F. Goodrich Chemical Group, polystyrene latex, such as DL6622A, DL6688A, and DL6687A from Dow Chemical Company, styrene-butadiene latexes, such as 76 RES 4100 and 76 RES 8100 available from Union Oil Chemicals Division, Tylac resin emulsion 68-412, Tylac resin emulsion 68-067, 68-319, 68-413, 68-500, 68-501, available from Reichhold Chemical Inc., and DL6672A, DL6663A, DL6638A, DL6626A, DL6620A, DL615A, DL617A, DL620A, DL640A, DL650A from Dow Chemical Company, butadiene-acrylonitrile latex, such as Hycar 1561 and Hycar 1562 from B F. Goodrich Chemical Group and Tylac Synthetic Rubber Latex 68-302 from Reichhold Chemicals Inc., butadiene-acrylonitrile-styrene terpolymer latex, such as Tylac synthetic rubber latex 68-513 from Reichhold Chemicals Inc., and the like, as well as mixtures thereof;

(B) water soluble polymers such as (1) starch (Starch SLS-280, St. Lawrence Starch); (2) cationic starch (Cato-72, National Starch); (3) gelatin (calfskin gelatin, Polymer Sciences); (4) hydroxypropylmethyl cellulose (Methocel K35LV available from Dow Chemical Company); (5) sodium carboxymethyl cellulose (CMC Type 7HOF, 7H3SX, Hercules Chemical Company); (6) hydroxyethyl cellulose (Natrosol 250LR, Hercules Chemical Company); (7) sodium carboxymethyl hydroxyethyl cellulose (CMHEC 43H, 37L, Hercules Chemical Company; CMHEC 43H is a high molecular weight polymer with carboxymethyl cellulose (CMC)/hydroxyethyl cellulose (HEC) ratio of 4:3; CMHEC is low molecular weight polymer with CMC/HEC ratio of 3:7); (8) hydroxypropyl cellulose (Klucel Type E, Hercules); (9) water soluble ethylhydroxyethyl cellulose (Bermocoll, Berol Kem, AB. Sweden); (10) methyl cellulose (Methocel AM4, Dow Chemical Company); (11) poly (acrylamide) (Scientific Polymer Products); (12) acrylamide-acrylic acid copolymer (Scientific Polymer Products); (13) poly(vinyl alcohol) (Elvanol, DuPont Company); (14) poly(vinyl pyrrolidone) (GAF Corporation); (15) poly(ethylene imine) epichlorohydrin (Scientific Polymer Products); (16) poly(2-acrylamido-2-methyl propane sulfonic acid) (Scientific Polymer Products); (17) poly(ethylene oxide) (Poly OX WSRN-3000, Union Carbide); (18) cellulose sulfate (Scientific Polymer Products); (19) quaternary ammonium copolymers (Mirapol WT, Mirapol AD-1, Mirapol AZ-1, Mirapol A-15, Mirapol-9, Merquat-100, Merquat-550, Miranol Incorporated); (20) hydroxy butylmethyl cellulose (HBMC, Dow Chemical Company); (21) vinylmethylether/maleic acid copolymer (Gantrez S-95, GAF Corporation); (22) poly(imidazoline) quaternized (Scientific Polymer Products); (23) hydroxyethylmethyl cellulose (HEM, British Celanese Ltd., Tylose MH, MHK, Kalle A.G.); and (24) cationic hydroxyethyl cellulose (Polymer JR-125, polyquaternium-10, Amerchol; cationic Cellosize, Union Carbide).

In addition, the curl preventing fluid composition contains lightfastness inducing agents present, for example, in an amount of from about 0.1 percent by weight to about 10 percent by weight, and preferably from about 1 percent by weight to about 5 percent by weight including UV absorbing compounds including glycerol 4-amino benzoate, available as Escalol 106, from Van Dyk Corporation; resorcinol mono benzoate, available as RBM from Eastman Chemicals; octyl dimethyl amino benzoate, available as Escalol 507 from Van Dyk Corporation; hexadecyl 3,5-di-tert-butyl-4-hydroxy-benzoate, available as Cyasorb UV-2908, #41,320-8, from Aldrich Chemical Company; octyl salicylate, available as Escalol 106 from Van Dyk Corporation; octyl methoxy cinnamate, available as Parasol MCX from Givaudan Corporation; 4-allyloxy-2-hydroxybenzophenone, available as Uvinul 600, #41,583-9, from Aldrich Chemical Company; 2-hydroxy-4-methoxy benzophenone, available as Anti UVA, from Acto Corporation; 2,2'-dihydroxy-4,4'-dimethoxy benzophenone, available as Uvinul D49, #D11, 100-7, from Aldrich Chemical Company; 2-hydroxy-4-(octyloxy) benzophenone, available as Cyasorb UV-531, #41,315-1, from Aldrich Chemical Company; 2-hydroxy-4-dodecyloxy benzophenone, available as DOBP from Eastman Chemicals; 2-(2'-hydroxy-5'-methylphenyl) benzotriazole, available as Tinuvin 900 from Ciba Geigy Corporation; 2-[2'-hydroxy-3,5-di-(1,1-dimethyl benzyl) phenyl]-2H-benzotriazole, available as Topanex 100BT from ICI America Corporation; bis[2-hydroxy-5-tert-octyl-3-(benzotriazol-2-yl)phenyl methane, available as Mixxim BB/100 from Fairmount Corporation; 2-( 3',5'-di-tert-butyl-2'-hydroxyphenyl)-5-chlorobenzo triazole, available as Tinuvin 327 from Ciba Geigy Corporation; 2-(4-benzoyl-3-hydroxy phenoxy)ethylacrylate (Cyasorb UV-416, #41,321-6, available from Aldrich Chemical Company), poly[2-(4-benzoyl-3-hydroxyphenoxy)-ethylacrylate] Cyasorb UV-2126, #41,323-2, available from Aldrich Chemical Company), N-(4-ethoxycarbonyl phenyl)-N'-ethyl-N'-phenyl formadine, available as Givesorb UV-2 from Givaudan Corporation; 1,1-(1,2-ethane-diyl) bis(3,3,5,5-tetramethyl pipera-zinone), available as Good-rite UV 3034 from Goodrich Chemicals; tris(3,5-di-tert-butyl-4-hydroxybenzyl)isocyanurate, available as Good-rite UV 3114 from Goodrich Chemicals; nickel-bis(o-ethyl(3,5-di-tert-butyl-4-hydroxybenzyl)phosphonate, available as Irgastab 2002 from Ciba Geigy Corporation; [2,2,6,6-tetramethyl-4-piperidinyl)-1,2,3,4-butane-tetracarboxylate, available as Mixxim HALS 57 from Fairmount Corporation; [2,2,6,6-tetramethyl-4-piperidinyl/β,β,β',β'-tetramethyl-3,9-(2,4,8,10-tetraoxospiro-(5,5)-undecane) diethyl]-1,2,3,4-butane-tetracarboxylate, available as Mixxim HALS 68 from Fairmount Corporation; [1,2,2,6,6-pentamethyl-4-piperidinyl/β,β,β',β'-tetramethyl-3,9-(2,4,8,10-tetraoxospiro-(5,5)-undecane) diethyl]-1,2,3,4-butane-tetracarboxylate, available as Mixxim HALS-63 from Fairmount Corporation; 2-dodecyl-N-(2,2,6,6-tetramethyl-4-piperidinyl)succinimide, available as Cyasorb UV-3581, #41,317-8, from Aldrich Chemical Company; 2-dodecyl-N-(1,2,2,6,6-pentamethyl-4-piperidinyl) succinimide, available as Cyasorb UV-3604, #41,318-6, from Aldrich Chemical Company; N-(1-acetyl-2,2,6,6-tetramethyl-4-piperidinyl)-2-dodecyl-succinimide, available as Cyasorb UV-3668, #41,319-4, from Aldrich Chemical Company; tetrasodium-N-(1,2-dicarboxyethyl)-N-octadecyl-sulfosuccinamate, available as Aerosol 22N from American Cyanamid Corporation; nickel dibutyldithio carbamate, available as UV-Chek AM-105 from Ferro Corporation; poly(4-hydroxy-2,2,6,6-tetra methyl-1-piperidine ethanol/dimethyl succinic acid), available as Tinuvin 622LD from Ciba-Geigy Corporation; poly(3,5-di-tert-butyl-4-hydroxy hydrocinnamic acid ester/1,3,5-tris(2-hydroxyethyl)-5-triazine-2,4,6(1H,3H,5H)-trione, available as Goodrite-3125 from Goodrich Chemicals; poly[N,N-bis(2,2,6,6-tetramethyl-4-piperidinyl)-1,6-hexanediamine-co-2,4-dichloro-6-morpholino-1,3,5-triazine), available as Cyasorb UV-3346, #41,324-0, from Aldrich Chemical Company; 1-[N-[poly(3-allyloxy-2-hydroxypropyl)-2-aminoethyl]-2-imidazolidinone, #41,026-8, available from Aldrich Chemical Company; poly(2-ethyl-2-oxazoline), #37,284-6, #37,285-4, #37,397-4, available from Aldrich Chemical Company.

Further, the curl preventing fluid composition can contain lightfastness inducing antioxidant compounds such as didodecyl 3,3'-thiodipropionate, available as Cyanox, LTDP, #D12,840-6, from Aldrich Chemical Company; ditridecyl-3,3'-thiodipropionate, available as Cyanox-711, #41,311-9, from Aldrich Chemical Company; ditetradecyl-3,3'-thiodipropionate, available as Cyanox, MTDP, #41,312-7, from Aldrich Chemical Company; dicetyl-3,3'-thiodipropionate, available as Evanstab 16 from Evans Chemetics Corporation; dioctadecyl-3,3'-thiodipropionate, available as Cyanox, STDP, #41,310-0, from Aldrich Chemical Company; triethyleneglycol-bis[3-(3'-tert-butyl-4'-hydroxy-5'-methylphenyl)propionate], available as Irganox 245 from Ciba-Geigy Corporation; octadecyl 3-(3,5-di-tert-butyl-4-hydroxyphenyl) propionate, available as Ultranox 276, from General Electric Company; 1,6-hexamethylene-bis(3,5-di-tert-butyl-4-hydroxyhydrocinnamate), available as Irganox 259 from Ciba-Geigy Corporation; tetrakis [methylene(3,5-di-tert-butyl-4-hydroxy hydrocinnamate), available as Irganox 1010 from Ciba-Geigy Corporation; thiodiethylenebis(3,5-di-tert-butyl-4hydroxy)hydrocinnamate, available as Irganox 1035, from Ciba-Geigy Corporation; octadecyl-3,5-di-tert-butyl-4-hydroxy hydrocinnamate, available as Irganox 1076 from Ciba-Geigy-Corporation; N,N'-hexamethylenebis(3,5-di-tert-butyl-4-hydroxyhydro cinnamide), available as Irganox 1098 from Ciba-Geigy Corporation; 2,2-bis[4-(2-(3,5-di-tert-butyl-4-hydroxyhydrocinnamoyloxy))ethoxy phenyl]propoane, available as Topanol 205 from ICI America Corporation; N-stearoyl-4-aminophenol, available as Sucnox-18 from Hexcel Corporation; 2,6-di-tert-butyl-4-methyl phenol, available as Ultranox 226 from General Electric Company; 2,6-di-tert-butyl-4-cresol, available as Vulkanox KB from Mobay Chemicals; 2,6-di-tert-butyl-α-dimethylamino-4-cresol, available as Ethanox 703 from Ethyl Corporation; 2,2'-isobutylidene-bis(4,6-dimethyl phenol), available as Vulkanox-NKF from Mobay Chemicals; 2,2'-methylenebis (6-tert-butyl-4-methyl phenol), available as Cyanox 2246, #41,315-5, from Aldrich Chemical Company; 2,2'-methylene bis(6-tert-butyl-4-ethylphenol), available as Cyanox 425, #41,314-3, from Aldrich Chemical Company; tris(4-tert-butyl-3-hydroxy-2,6-dimethyl benzyl) isocyanurate, available as Cyanox 1790, #41,322-4, LTDP, #D12,840-6, from Aldrich Chemical Company; 1,3,5-trimethyl-2,4,6-tris(3,5-di-tert-butyl-4-hydroxybenzyl) benzene, available as Ethanox 300, #41,328-3, from Aldrich Chemical Company; triphenyl phosphite, available as Lankromark-LE65 from Harcros Corporation; tris(nonyl phenyl)phosphite, available as Lankromark-LE109 from Harcros Corporation; tris(2,4-di-tert-butyl-phenyl) phosphite, available as Wytox-240 from Olin-Corporation; 2,2-ethylidene-bis(4,6-di-tert-butyl phenyl) fluorophosphonite, available as Ethanox-398 from Ethyl Corporation; octylated diphenyl amine available as Anchor ODPA from Anchor Corporation; N,N'-β,β'-naphthalene-4-phenylenediamine, available as Anchor DNPD from Anchor Corporation; 4,4'-methylene-bis(dibutyldithio carbamate), available as Vanlube-7723 from Vanderbilt Corporation; antimony dialkyldithiocarbamate, available as Vanlube-73 from Vanderbilt-Corporation; antimony-dialkylphosphorodithioate, available as Vanlube-622 from Vanderbilt Corporation; molybdenum-oxysulfide dithiocarbamate, available as Vanlube-622 from Vanderbilt-Corporation; 2,2,4-trimethyl-1,2-hydroquinoline, available as Vulkanox-HS from Mobay Corporation; and mixtures thereof.

Moreover, the curl preventing fluid composition contains lightfastness inducing antiozonants such as N-isopropyl-N'-phenyl-phenylene diamine, available as Santoflex IP from Monsanto Chemicals; N-(1,3-dimethylbutyl)-N'-phenyl-phenylene-diamine, available as Santoflex 13 from Monsanto Chemicals; N,N'-di(2-octyl)-4-phenylenediamine, available as Antozite-1 from Vanderbilt Corporation; N,N'-bis(1,4-dimethyl pentyl)-4-phenylene diamine, available as Santoflex 77 from Monsanto Chemicals; 2,4,6-tris-(N-1,4-dimethylpentyl-4-phenylene diamino)-1,3,5-triazine, available as Durazone 37 from Uniroyal Corporation; 6-ethoxy-1,2-dihydro-2,2,4-trimethyl quinoline, available as Santoflex AW from Monsanto Chemicals; bis-(1,2,3,6-tetrahydrobenzaldehyde) pentaerythritol acetal, available as Vulkazon AFS/LG, from Mobay Corporation; Paraffin Wax, available as Petrolite C-700, Petrolite C-1035, from Petrolite Corporation; and mixtures thereof.

Suitable antistatic agents include both anionic and cationic materials. Monoester sulfosuccinates, diester sulfosuccinates and sulfosuccinamates are anionic antistatic components that have been found suitable for use in the present coatings. Suitable cationic antistatic components comprise diamino alkanes; quaternary salts; quaternary acrylic copolymer latexes, such as HX-42-1, HX-42-3, available from Interpolymer Corporation; ammonium quaternary salts as disclosed in U.S. Pat. No. 5,320,902; phosphonium quaternary salts as disclosed in copending application U.S. Ser. No. 08/034,91; and sulfonium, thiazolium and benzothiazolium quaternary salts as disclosed in U.S. Pat. No. 5,314,747. The disclosures of the aforementioned application and patents are totally incorporated herein by reference.

In addition, the curl preventing fluid composition contains one or more biocides. Examples of suitable biocides include (A) nonionic biocides, such as (1) 2-hydroxypropylmethane thiosulfonate (Busan 1005 available from Buckman Laboratories Inc.); (2) 2-(thiocyanomethyl thio)benzothiazole (Busan 30WB, 72WB, available from Buckman Laboratories Inc.); (3)methylene bis(thiocyanate) (Metasol T-10 available from Calgon Corporation; AMA-110 available from Vinings Chemical Company; Vichem MBT available from Vineland Chemical Company; Aldrich 10,509-0); (4) 2-bromo-4'-hydroxyacetophenone (Busan 90 available from Buckman Laboratories); (5) 1,2-dibromo-2,4-dicyano-butane (Metasol CB-210, CB-235, available from Calgon Corporation); (6) 2,2-dibromo-3-nitropropionamide (Metasol RB-20 available from Calgon Corporation; Amerstat 300 vailable from Drew Industrial Div.); (7) N-α-(1-nitroethyl benzylethylene diamine) (Metasol J-26 available from Calgon Corporation); (8) dichlorophene (G-4 vailable from Givaudan Corporation); (9) 3,5-dimethyl tetrahydro-2H-1,3,5-thiadiazine-2-thione (SLIME-TROL RX-28 available from Betz Paper Chem Inc.; Metasol D3T-A available from Calgon Corporation; SLIME ARREST available from Western Chemical Company); (10) a nonionic blend of a sulfone, such as bis(trichloromethyl) sulfone and methylene bisthiocyanate (available as SLIME-TROL RX-38A from Betz Paper Chem Inc.); (11) a nonionic blend of methylene bisthiocyanate and bromonitrostyrene (available as SLIME-TROL RX-41 from Betz Paper Chem Inc.); (12) a nonionic blend of 2-(thiocyanomethylthio) benzothiazole (53.2 percent by weight) and 2-hydroxypropyl methanethiosulfonate (46.8 percent by weight) (available as BUSAN 25 from Buckman Laboratories Inc.); (13) a nonionic blend of methylene bis(thiocyanate), 50 percent by weight, and 2-(thiocyanomethylthio)benzothiazole, 50 percent by weight, (available as BUSAN 1009, 1009WB from Buckman Laboratories Inc.); (14) a nonionic blend of 2-bromo-4'-hydroxyacetophenone (70 percent by weight) and 2-(thiocyanomethylthio)benzothiazole (30 percent by weight) (BUSAN 93 available from Buckman Laboratories Inc.); (15) a nonionic blend of 5-chloro-2-methyl-4-isothiazoline-3-one (75 percent by weight) and 2-methyl-4-isothiazolin-3-one (25 percent by weight), (available as AMERSTAT 250 from Drew Industrial Division; NALCON 7647 from NALCO Chemical Company; Kathon LY from Rohm and Haas Co.); and the like, as well as mixtures thereof; (B) anionic biocides, such as (1) anionic potassium N-hydroxymethyl-N-methyl-dithiocarbamate (available as BUSAN 40 from Buckman Laboratories Inc.); (2) an anionic blend of N-hydroxymethyl-N-methyl dithiocarbamate (80 percent by weight) and sodium 2-mercapto benzothiazole (20 percent by weight) (available as BUSAN 52 from Buckman Laboratories Inc.); (3) an anionic blend of sodium dimethyl dithiocarbamate, 50 percent by weight, and (disodium ethylenebis-dithiocarbamate), 50 percent by weight, (available as METASOL 300 from Calgon Corporation; AMERSTAT 272 from Drew Industrial Division; SLIME CONTROL F from Western Chemical Company); (4) an anionic blend of N-methyldithiocarbamate, 60 percent by weight, and disodium cyanodithio imido carbonate, 40 percent by weight, (available as BUSAN 881 from Buckman Laboratories Inc.); (5) an anionic blend of methylene bis-thiocyanate (33 percent by weight), sodium dimethyl-dithiocarbamate (33 percent by weight), and sodium ethylene bisdithiocarbamate (33 percent by weight) (available as AMERSTAT 282 from Drew Industrial Division; AMA-131 from Vinings Chemical company); (6) sodium dichlorophene (G-4-40, available from Givaudan Corporation); and the like, as well as mixtures thereof; (C) cationic biocides, such as (1) cationic poly(oxyethylene (dimethylamino)-ethylene(dimethylamino) ethylene dichloride) (Busan 77 available from Buckman Laboratories Inc.); (2) a cationic blend of methylene bisthiocyanate and dodecyl guanidine hydrochloride (available as SLIME TROL RX-31, RX-32, RX-32P, RX-33 from Betz Paper Chem Inc.); (3) a cationic blend of a sulfone, such as bis(trichloromethyl) sulfone and a quaternary ammonium chloride (available as SLIME TROL RX-36 DPB-865 from Betz Paper Chem. Inc.); (4) a cationic blend of methylene bis-thiocyanate and chlorinated phenols (SLIME-TROL RX-40 from Betz Paper Chem Inc.); and the like, as well as mixtures thereof. The biocide can be present in any effective amount; typically, the biocide is present in an amount of from about 0.001 percent to about 5 percent by weight of the coating, although the amount can be outside this range.

In addition, the substrate, such as paper curl preventing fluid composition, can contain color pigment components especially those that exhibit a light color. Pigments can be present in any effective amount, and if present, typically are present in amounts of from about 0.1 to about 10 percent by weight of the coating composition. Examples of pigment components include zirconium oxide (SF-EXTRA available from Z-Tech Corporation), colloidal silicas, such as Syloid 74, available from Grace Company (preferably present, in one embodiment, in an amount of from about 0.5 to about 5 percent by weight percent), titanium dioxide (available as Rutile or Anatase from NL Chem Canada, Inc.), hydrated alumina (Hydrad TMC-HBF, Hydrad TM-HBC, available from J. M. Huber Corporation), barium sulfate (K.C. Blanc Fix HD80, available from Kali Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blend of calcium fluoride and silica, such as Opalex-C available from Kemira O.Y, zinc oxide, such as Zoco Fax 183, available from Zo Chem, blends of zinc sulfide with barium sulfate, such as Lithopane, available from Schteben Company, and the like, as well as mixtures thereof. Brightener pigments can enhance color mixing and assist in improving print-through in imaging substrates of the present invention.

In one embodiment, the fluid compositions of the present applications are comprised of a water soluble/dispersible paper desizing agent present in an amount of from about 0.1 percent by weight to about 20 percent by weight, a water soluble/dispersible paper anticurl/decurling agent present in an amount of from about 0.1 percent by weight to about 20 percent by weight, a defoamer present in an amount of from about 0.1 percent by weight to about 10 percent by weight, a biocide present in an amount of from about 0.1 percent by weight to about 5 percent by weight, an antistatic agent present in an amount of from about 0.1 percent by weight to about 15 percent by weight, a lightfastness promoting agent present in an amount of from about 0.1 percent by weight to about 10 percent by weight, a filler present in an amount of from about 0.1 percent by weight to about 4 percent by weight, and a polymeric binder present in an amount of from about 0.1 percent by weight to about 15 percent by weight, and water present in an amount of from about 99.2 percent by weight to about 1 percent by weight.

In embodiments, the thickness of the fluid compositions on the imaged papers can be from about 0.5 micron to about 20 microns, and for example, from about 1 to about 10 microns.

The curl preventing fluid compositions of the present application are applied on to paper in a manner similar to that described in U.S. Pat. No. 5,434,029. A pair of rollers similar to a fuser, operating at significantly lower load and temperature, are utilized for curl prevention. The roll that contacts the back side of the copy has a fluid composition applicator sump used in a manner similar to a donor roll RAM (Release Agent Management) system in roll fusers such as that shown in U.S. Pat. No. 4,254,732. A metering blade controls the amount of fluid composition applied to the back side of the copy. The amount of this fluid composition varies from about 200 to about 250 milligrams in order to compensate for the 150 milligrams water loss encountered by a typical copy paper during the toner fusing process. In addition to the application of the fluid composition to the back side of the copy substrate, the fluid applying roll can cooperate with a second roller to constrain the substrate while it is absorbing the fluid composition. Thus, the fluid composition can be applied to the substrate simultaneously with the constraint of the substrate by the pressure of the pair of rollers. The disclosures of each of the aforementioned two patents are totally incorporated herein by reference.

In the known formation and development of xerographic images, there is generally applied to a latent image generated on a photoconductive member a toner composition (dry or liquid) of resin particles and pigment particles. Thereafter, the image can be transferred to a suitable substrate, such as natural cellulose, the papers of the present invention, or plastic paper and affixed thereto by, for example, heat, pressure or combination thereof.

The imaging method in ink jet printing involves, for example, the use of one or more ink jet assemblies connected to a pressurized source of ink, which is comprised of water, glycols, and a colorant such as magenta, cyan, yellow or black dyes. Each individual ink jet includes a very small orifice usually of a diameter of 0.0024 inch, which is energized by magneto restrictive piezoelectric means for the purpose of emitting a continuous stream of uniform droplets of ink at a rate of 33 to 75 kilohertz. This stream of droplets is desirably directed onto the surface of a moving web of, for example, the treated paper of the present invention, which stream is controlled to permit the formation of printed characters in response to video signals derived from an electronic character generator and in response to an electrostatic deflection system.

The Hercules size values recited herein were measured on the Hercules sizing tester (Hercules Incorporated) as described in TAPPI STANDARD T-530 pm-83 issued by the Technical Association of the Pulp and Paper Industry. This method is closely related to the widely used ink flotation test. The TAPPI method has the advantage over the ink flotation test of detecting the end point photometrically. The TAPPI method employs a mildly acidic aqueous dye solution as the penetrating component to permit optical detection of the liquid front as it moves through the paper sheet. The apparatus determines the time required for the reflectance of the sheet surface not in contact with the penetrant to drop to a predetermined (80 percent) percentage of its original reflectance.

The porosity values recited herein were measured with a Parker Print-Surf porosimeter which records the volume of air/minutes flowing through a sheet of paper.

The imaged substrates of the present invention exhibit reduced hanging curl as well as flat curl upon being printed with dry toners. Generally, the term "hanging curl" refers to the distance between the base line of the arc formed by the imaged substrates when viewed in cross-section across its width (or shorter dimension, for example 8.5 inches in an 8.5 by 11 inch sheet, as opposed to length, or longer dimension, for example 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve. Generally, the term "flat curl" refers to the average height of the four corners of a printed paper laying flat on its nonimaged side.

The optical density measurements recited herein were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the back side of a black printed area against a black background) measured at a wavelength of 560 nanometers.

Specific embodiments of the invention will now be described in detail. These examples are intended to be illustrative, and the invention is not limited to the materials, conditions, or process parameters set forth in these embodiments. All parts and percentages are by weight unless otherwise indicated.

COMPARATIVE EXAMPLE I

Xerographic images were generated on a test color copier device, similar to the Xerox Corporation 5770, and using 100 micron thick commercial papers (length=28 centimeters, width=21.5 centimeters), such as Hammermill Tidal DP, Xerox 4200DP, Rank Xerox, Premier ECF3R91781, Rank Xerox Premier TCF3R91805, Champion Courtland, Rank Xerox Business, 3R91820, Rank Xerox Exclusive, 3R90208, Rank Xerox Premier, 3R91854, Xerox 4024, Cascade Xerographic Paper, Spectrum DP, Husky Xerocopy, Xerox Image Elite, Xerox Image Series LX, Fuji Xerox "L", and Recycled Bond Paper. The area coverage in each printing was selected at 80 percent (unprinted border of 1.2;1.2;1.3;1.7 centimeters). Subsequent to being subjected to hot fuser rolls, these images were placed in a constant temperature room set at 23° C. and 50 percent humidity for 7 days. Thereafter, these imaged papers were tested for hanging curl using Xerox Standard Template Curves, and the papers were also tested for flat curl. The flat curl values of the tested papers were within ±5.0 millimeters of 40 millimeters, and their hanging curve values were within ±5.0 millimeters of 150 millimeters. The Flat Surface Curl was found to be lower to that in the hanging position primarily because of the weight of the paper. For example, flat curl values of 5, 10, 15, 40 millimeters correspond to hanging curl values of 40, 70, 96, 200 millimeters, respectively. All measurements were made after a constant time of 7 days.

COMPARATIVE EXAMPLE II

Xerographic images were generated on a color copier test fixture with 100 microns thick commercial Xerox 4200DP papers (length=28 centimeters, width=21.5 centimeters). The area coverage in each printing was selected at 80 percent (unprinted border of 1.2; 1.2; 1.3; 1.7 centimeters). After having been subjected to a water treatment [150 milligrams of water per page] prior to passing through hot fuser rolls, the images were placed in a constant temperature room maintained at 23° C. and 50 percent humidity for 7 days. Thereafter, the imaged papers were tested for hanging curl using Xerox Corporation Standard Template Curves, and the papers were tested for flat curl. The flat curl values of the tested papers were within ±2.0 millimeters of 22 millimeters, and their hanging curve values were within ±10.0 millimeters of 90 millimeters.

COMPARATIVE EXAMPLE III

Xerographic images were generated on a color copier test fixture with 100 microns thick commercial Xerox Corporation 4200 DP papers (length=28 centimeters, width=21.5 centimeters). The area coverage in each printing was selected at 80 percent (unprinted border of 1.2; 1.2; 1.3; 1.7 centimeters). Subsequent to being subjected to a blend of 98 percent water and 2 percent of the surfactant poly(dimethyl siloxane)-b-poly(propylene oxide)-b-poly(ethylene oxide) copolymers (Alkasil NEP 73-70, Alkaril Chemicals), [150 milligrams of blend per page], and prior to passing the imaged papers through hot fuser rolls, the images were placed in a constant temperature room maintained at 23° C. and 50 percent humidity for 7 days. Thereafter, the imaged papers were tested for hanging curl with a Xerox Corporation Standard Template Curves, and they were also tested for flat curl. The flat curl values of all these papers were within ±2.0 millimeters of 13 millimeters, and their hanging curve values were within ±10.0 millimeters of 70 millimeters.

EXAMPLE IV

Xerographic images were generated on a Xerox Corporation 5770 color copier test fixture with 100 microns thick commercial Xerox 4200DP papers (length=28 centimeters, width=21.5 centimeters). The area coverage in each was selected at 80 percent (unprinted border of 1.2; 1.2; 1.3; 1.7 centimeters). There was added to the papers by a pumping system that delivers about 200 milliliters of water per page, an anticurl fluid composition comprised of 95 percent water, 1 percent by weight of a heat shrinkable binder rubber latex neoprene available from Serva Biochemicals, 1 percent by weight of the water soluble/dispersible paper desizing agent poly(propylene glycol) (Alkapol PPG-4000, Alkaril Chemicals), 1 percent by weight of the water soluble/dispersible paper anticurl agent pantothenol, (Aldrich #29, 578-7), 0.5 percent by weight of defoamer tetramethyl decynediol and amorphous silica, Surfynol-104S, available from Air Products Company, 0.5 percent by weight of a biocide derived from a cationic blend of methylene bisthiocyanate and dodecyl guanidine hydrochloride (available as SLIME TROL RX-31 from Betz Paper Chem Inc.); 0.5 percent by weight of an antistatic agent quaternary acrylic copolymer latex, HX-42-3 available from Interpolymer Corporation, 0.4 percent by weight of a lightfastness promoting agent 1,1-(1,2-ethane-diyl)bis(3,3,5,5-tetramethyl piperazinone), available as Good-rite UV 3034 from Goodrich Chemicals, 0.1 percent by weight of a filler calcium carbonate (Microwhite Sylacauga Calcium Products), [200 milligrams of blend per page] prior to passing these through hot fuser rolls, these images were placed in a constant temperature room set at 23° C. and 50 percent humidity for 7 days. After that period, these imaged papers were tested for hanging curl using Xerox Standard Template Curves, and for flat curl. The flat curl values of all these papers were within ±1.0 millimeter of 5 millimeters whereas their hanging curve values were within ±5.0 millimeters of 20 millimeters. These images were lightfast, about 100 percent, without any degradation for a period of 6 months.

EXAMPLE V

Xerographic images were generated on a color xerographic test fixture device with 100 microns thick commercial Xerox 4200DP papers (length=28 centimeters, width=21.5 centimeters). The area coverage in each printing was selected at 80 percent (unprinted border of 1.2; 1.2; 1.3; 1.7 centimeters). There was added to the papers a fluid composition, which addition and coating was by a pumping system that delivers about 200 milliliters of water per page, and which fluid was comprised of 95 percent water, 1 percent by weight of heat shrinkable binder paraffin wax emulsions Paracol 404C available from Hercules Incorporated, 1 percent by weight of the water soluble/dispersible paper desizing agent poly(dimethyl siloxane)-b-poly(propylene oxide)-b-poly(ethylene oxide) copolymers (Alkasil NEP 73-70, Alkaril Chemicals), 1 percent by weight of the water soluble/dispersible paper anticurl agent trimethylolpropane ethoxylate methylether diacrylate (Aldrich #40,587-1), 0.5 percent by weight of defoamer tetramethyl decynediol and amorphous silica, Surfynol-104S available from Air Products Company, 0.5 percent by weight of a biocide derived from a cationic blend of methylene bisthiocyanate and dodecyl guanidine hydrochloride (available as SLIME TROL RX-31 from Betz Paper Chem Inc.); 0.5 percent by weight of an antistatic agent quaternary acrylic copolymer latex, HX-42-3 available from Interpolymer Corporation, 0.4 percent by weight of a lightfastness promoting agent 1,1-(1,2-ethane-diyl)bis(3,3,5,5-tetramethyl piperazinone), available as Good-rite UV 3034 from Goodrich Chemicals, 0.1 percent by weight of a filler calcium carbonate (Microwhite Sylacauga Calcium Products), [200 milligrams of blend per page] prior to passing these through hot fuser rolls, these images were placed in a constant temperature room set at 23° C. and 50 percent humidity for 7 days Thereafter, these imaged papers were tested for hanging curl using a Xerox Corporation Standard Template Curves, and the imaged papers were also tested for flat curl. The flat curl values of the tested papers were within ±1.0 millimeters of 6 millimeters, and their hanging curve values were within ±5.0 millimeters of 25 millimeters. These images were lightfast, about 100 percent, without any degradation for a period of about 6 months.

Other embodiments and modifications of the present invention may occur to those of ordinary skill in the art subsequent to a review of the information presented herein; these embodiments and modifications, and equivalents thereof, are also included within the scope of this invention.

What is claimed is:

1. A composition comprised of a hydrophilic solvent, a polymeric binder, a water soluble/dispersible paper desizing agent, a water soluble/dispersible paper anticurl agent, a defoamer, a biocide, an antistatic agent, a lightfastness promoting agent, and a filler.

2. A composition in accordance with claim 1 and which composition minimizes paper curl, wherein the water soluble/dispersible paper desizing agent is present in an amount of from about 0.1 percent by weight to about 20 percent by weight, the water soluble/dispersible paper anticurl agent is present in an amount of from about 0.1 percent by weight to about 20 percent by weight, the defoamer is present in an amount of from about 0.1 percent by weight to about 10 percent by weight, the biocide is present in an amount of from about 0.1 percent by weight to about 5 percent by weight, the antistatic agent is present in an amount of from about 0.1 percent by weight to about 15 percent by weight, the lightfastness promoting agent is present in an amount of from about 0.1 percent by weight to about 10 percent by weight, the filler is present in an amount of from about 0.1 percent by weight to about 4 percent by weight, the polymeric binder is present in an amount of from about 0.1 percent by weight to about 15 percent by weight, and water is present in an amount of from about 99.2 percent by weight to about 1 percent by weight.

3. A composition in accordance with claim 1 wherein the composition is applied to an imaged paper in a thickness of from about 0.5 micron to about 20 microns, and wherein paper curling is minimized.

4. A composition in accordance with claim 1 wherein said paper desizing component is present in an amount of from about 0.1 percent by weight to about 20 percent by weight, and is selected from the group consisting of (1) hydrophilic poly(dialkylsiloxanes); (2) poly(alkylene glycol); (3) poly (propylene oxide)-poly(ethylene oxide) copolymers; (4) fatty ester modified compounds of phosphate, sorbitan, glycerol, poly(ethylene glycol), sulfosuccinic acid, sulfonic acid, and alkyl amine; (5) poly(oxyalkylene) modified compounds of sorbitan esters, fatty amines, alkanol amides, castor oil, fatty acid, fatty alcohol; (6) quaternary alkosulfate compounds; and (7) fatty imidazolines.

5. A composition in accordance with claim 4 wherein the hydrophilic poly(dialkyl siloxanes) are present in an amount of from about 0.1 percent by weight to about 20 percent by weight, and are selected from the group consisting of (1) carbinol terminated poly(ethylene oxide)-b-poly(dimethyl siloxane) diblock copolymers; (2) poly(ethylene oxide)-b-poly(dimethyl siloxane)-b-poly(ethylene oxide) triblock copolymers carbinol-terminated; (3) poly(dimethyl siloxane)-b-poly(ethylene oxide)-b-poly(propylene oxide)

triblock copolymers; (4) poly(dimethyl siloxane)-b-(methyl siloxane alkylene oxide) diblock copolymers wherein alkylene is ethylene, propylene or ethylene-propylene; and (5) polyquaternary poly(dimethyl siloxane).

6. A composition in accordance with claim 4 wherein the poly(alkylene glycol) is present in an amount of from about 0.1 percent by weight to about 20 percent by weight and which poly(alkylene glycol) is selected from the group consisting of (1) poly(propylene glycol), (2) poly(propylene glycol dimethacrylate), (3) poly(ethylene glycol diacrylate), (4) poly(ethylene glycol dimethacrylate), (5)poly(ethylene glycol monomethylether), (6) poly(ethylene glycol diglycidyl ether), and (7) poly(ethylene glycol dimethyl ether).

7. A composition in accordance with claim 4 wherein the fatty ester modified compounds are present in an amount of from about 0.1 percent by weight to about 20 percent by weight, and are selected from the group consisting of (1) mono and diesters of phosphates; (2) sorbitan mono laurate, (3) sorbitan mono oleate, (4) sorbitan trioleate, (5) glyceryl mono oleate, (6) glyceryl dioleate, (7) glyceryl trioleate, (8) poly(ethylene glycol) mono oleate, (9) poly(ethylene glycol) mono laurate, (10) poly(ethylene glycol) di-oleate, (11) poly(ethylene glycol)di-laurate, (12) poly(ethylene glycol) di-tallow; (13) sodium dioctyl sulfosuccinate, (14) ethoxylated alcohol sulfosuccinate, (15) sodium sulfosuccinate ester of lauric diethanolamide, (16) sodium lauryl sulfosuccinate, (17) isopropylamine dodecyl benzene sulfonate, (18) calcium dodecyl benzene sulfonate, (19) coco diethanol amide, (20) lauric diethanol amide, (21) coco monoethanol amide, (22) lauric monoethanol amide, (23) lauric mono isopropyl amide, or (24) soya diethanol amide.

8. A composition in accordance with claim 4 wherein the poly(oxyalkylene) modified compounds are present in an amount of from about 0.1 percent by weight to about 20 percent by weight, and which compounds are selected from the group consisting of (1) poly(oxyethylene) sorbitan mono-laurate, (2) poly(oxyethylene)sorbitan mono-oleate, (3) poly(oxyethylene) sorbitan trioleate, (4) tallow amine ethoxylates, (5) soya amine ethoxylates, (6) castor oil ethoxylates, (7) cocoalkanolamide ethoxylates, (8) oleic acid ethoxy lates, (9) lauric acid ethoxylates, (10) palmitic acid ethoxylates, (11) lauryl alcohol ethoxylates, (12) oleyl alcohol ethoxylates, (13) tallow alcohol ethoxylates, (14) nonyl phenol ethoxylates, or (15) octyl phenol ethoxylates.

9. A composition in accordance with claim 4 wherein the quaternary alkosulfate compounds are present in an amount of from about 0.1 percent by weight to about 20 percent by weight, and which compounds are selected from the group consisting of (1) nonpolymeric quaternary ammonium ethosulfate, (2) quaternary dialkyl dimethyl methosulfate, (3) alkoxylated di-tallow methosulfate quaternary, (4) quaternized tallow imidazoline methosulfate, or (5) quaternized oleic imidazoline methosulfate.

10. A composition according to claim 4 wherein the fatty imidazolines are present in an amount of from about 0.1 percent by weight to about 20 percent by weight, and which imidazolines are selected from the group consisting of (1) coco hydroxyethyl imidazoline, (2) oleic hydroxyethyl imidazoline, (3) tall oil amino ethyl imidazoline, or (4) sodium carboxylic coco imidazoline.

11. A composition in accordance with claim 1 wherein said paper anticurl agent is present in an amount of from about 0.1 percent by weight to about 20 percent by weight, and which agent is selected from the group consisting of (1) trimethylolpropane, (2) trimethylolpropane ethoxylate, (3) trimethylolpropane triacrylate, (4) trimethylolpropane trimethacrylate, (5) trimethylolpropane ethoxylate triacrylate, (6) trimethylol propane propoxylate triacrylate, (7) trimethylolpropane ethoxylate methylether diacrylate, (8) trimethylolpropane tris(2-methyl-1-aziridine propionate), (9) neopentyl glycol ethoxylate, (10) neopentyl glycol propoxylate, (11) glycerol propoxylate, (12) glycerol propoxylate-b-ethoxylatetriol, (13) glycerol ethoxylate-b-propoxylatetriol, (14) pentaerythritol ethoxylate, (15) pentaerythritol propoxylate, (16) pentaerythritol propoxylate/ethoxylate, (17) triethanolamine ethoxylate, (18) N-methyldiethanolamine, (19) N-ethyldiethanolamine, (20) N-butyl diethanol amine, (21) N-phenyl diethanolamine, (22) triethanol amine, (23) trioctylamine, (24) 4-xylylene diamine, (25) 1,4-bis(2-hydroxyethoxy)-2-butyne, (26) pantothenol, (27) 1-phenyl-1,2-ethanediol, (28) 3-methoxy-1,2-propanediol, (29) 3-allyloxy-1,2propanediol (30) 3-ethoxy-1,2-propanediol, (31) 3-phenoxy-1,2-propanediol, (32) 3-octa-decyloxy-1,2-propanediol, (33) 3-(4-methoxyphenoxy)-1,2-propanediol, (34) [3-(2-methylphenoxy)-1,2-propanediol], (35) 3-amino-1,2-propanediol, (36) 3-(diethylamino)-1,2-propanediol, (37) 2-phenyl-1,2-propanediol, (38) 3-(diisopropyl amino)-1,2-propanediol, (39) 3-(N-benzyl-N-methylamino)-1,2-propanediol, (40) 3-pyrrolidino-1,2-propanediol, (41) 3-piperidino-1,2-propanediol, (42) 3-morpholino-1,2-propanediol, (43) 2,2dimethyl-1-phenyl-1,3-propane diol, (44) 2-benzyloxy-1, 3-propanediol, (45) 4-8-bis (hydroxymethyl)tricyclo[5.2.1.02.]decane, (46) 1-[N,N-bis (2-hydroxyethyl) isopropanolamine, (47) N,N-bis(2-hydroxypropyl)ethanolamine, (48) 1-[2-(2-hydroxyethoxy) ethyl]-piperazine, (49) 1-4-bis(2-hydroxyethyl)piperazine, (50) homovanillyl alcohol, (51) phenethyl alcohol, (52) 3,6-dimethyl-4-octyne-3,6-diol, (53) 2-(hydroxymethyl)-1, 3-propanediol, (54) 2-butyl-2-ethyl-1,3-propanediol, (55) 2-piperidine methanol, (56) 2,2,4-trimethyl-1,3-pentanediol, (57) Vitamin E, (58) Vitamin E acetate, (59) Vitamin K, (60) tri(ethyleneglycol)dimethylacrylate, (61) triethylcitrate, and (62) 2,4,7,9-tetramethyl-5-decyne-4,7-diol.

12. A composition in accordance with claim 1 wherein the deformer is (1) polydimethyl siloxane, (2) silicone/polyalkylene glycol, (3) oleamide, (4) stearamide, (5) stearylerucamide, (6) oleylpalmitamide, (7) erucylstearamide, (8) ethylenedioleamide, (9) ethylenedistearamide, (10) methyl oleate, (10) propyloleate, (11) glyceryloleate, (12) glycerylricinoleate, (13) sorbitan oleate, (14) polyethyleneglycol-12-stearate, (15) polyethyleneglycol-20-glycerol stearate, (16) polyethylene oxide/polypropyleneoxide block copolymers, (17) stearyl alcohol, (18) isostearylalcohol, (19) cetearylalcohol, (20) polyethyleneglycol-2-oleammonium chloride, (21) polyethyleneglycol-15-oleammonium chloride, (22) polyethylene glycol-2-stearmonium chloride, (23) polyethylene glycol-15-stearmonium chloride, (24) polyethylene glycol-2-cocomonium chloride, (25) polyethyleneglycol-15-coco monium chloride, (26) octadecyl diethanol methyl ammonium chloride, (27) dicoco-dimoniumchloride, (28) ethylhydroxy ethyloleyloxazoline, (29) tributyl phosphate, (30) sulfonated oleic acid sodium salt, (31) phenol ethoxylate phosphate ester acid, or (32) imino propionate sodium salt.

13. A composition in accordance with claim 1 wherein the biocide is selected from the group comprised of (1) 2-hydroxy propylmethane thiosulfonate, (2) 2-(thiocyanomethyl thio)benzothiazole, (3) methylenebis (thiocyanate), (4) 2-bromo-4'-hydroxyacetophenone, (5) 1,2-dibromo-2,4-dicyano-butane, (6) 2,2-dibromo-3-nitropropionamide, (7) N-α-(1nitroethyl-benzyl ethylene diamine), (8) dichlorophene, (9) 3,5-dimethyl tetrahydro-2H-1,3,5-thiadiazine-2-thione, (10) a blend of bis (trichloromethyl) sulfone and methylene bisthiocyanate, (11) a nonionic blend of methylene bisthiocyanate and bromonitrostyrene, (12) a nonionic blend of 2-(thiocyanomethylthio) benzothiazole (about 53.2 percent by weight) and 2-hydroxypropyl methanethiosulfonate (about 46. 8 percent by weight), (13) a nonionic blend of methylene bis(thiocyanate), about 50 percent by weight, and 2-(thiocyanomethylthio) benzothiazole, about 50 percent by weight, (14) a nonionic blend of 2-bromo-4'-hydroxyacetophenone (about 70 percent by weight) and 2-(thiocyanomethylthio) benzothiazole (about 30 percent by weight), (15) a nonionic blend of 5-chloro-2-methyl-4-isothiazoline-3-one (about 75 percent by weight) and 2-methyl-4-isothiazolin-3-one (about 25 percent by weight), (16) anionic potassium N-hydroxy methyl-N-methyl-dithiocarbamate, (17) an anionic blend of N-hydroxymethyl-N-methyl dithiocarbamate (80 percent by weight) and sodium 2-mercapto benzothiazole (20 percent by weight), (18) an anionic blend of sodium dimethyl dithiocarbamate, about 50 percent by weight, and (disodium ethylenebis-dithiocarbamate), about 50 percent by weight, (19) an anionic blend of N-methyldithio carbamate about 60 percent by weight and disodium cyanodithioimido carbonate about 40 percent by weight, (20) an anionic blend of methylene bis-thiocyanate (33 percent by weight), sodium dimethyl-dithiocarbamate (about 33 percent by weight), and sodium ethylene bisdithiocarbamate (about 33 percent by weight), (21) cationic poly(oxyethylene(dimethylamino)-ethylene (dimethylamino)ethylene dichloride), (22) a cationic blend of methylene bisthiocyanate and dodecyl guanidine hydrochloride, (23) a cationic blend of bis(trichloromethyl) sulfone and quaternary ammonium chloride, and (24) a cationic blend about 50:50 of methylene bisthiocyanate, and chlorinated phenols.

14. A composition in accordance with claim 1 wherein the lightfastness agent is selected from the group consisting of (1) 2-(4-benzoyl-3-hydroxyphenoxy)ethylacrylate, (2) 1,2-hydroxy-4-(octyloxy)benzo-phenone, (3) poly[2-(4-benzoyl-3-hydroxyphenoxy)thylacrylate], (4) hexadecyl-3, 5-di-tert-butyl-4-hydroxy-benzoate (5) poly[N,N-bis(2,2,6, 6-tetramethyl-4-piperidinyl)-1,6-hexanediamine-co-2,4-dichloro-6-morpholino-1,3,5-triazine, (6) 2-dodecyl-N-(2,2, 6,6-tetramethyl-4-piperidinyl)succinimide, (7) 2-dodecyl-N-(1,2,2,6,6-pentamethyl-4-piperidinyl)succinimide, (8) N-(1-acetyl-2,2,6,6-tetramethyl-4-piperidinyl)-2-dodecylsuccinimide, (9) 1-[N-[poly(3-allyloxy-2-hydroxypropyl)-2-aminoethyl]-2-imidazolidinone, (10) 2,2'-methylenebis(6-tert-butyl-4-methyl phenol), (11) 2,2'-methylenebis(6-tert-butyl-4-ethylphenol), (12) tris(4-tert-butyl-3-hydroxy-2,6-dimethylbenzyl)isocyanurate, (13) didodecyl-3,3'-thiodipropionate, (14) ditridecyl-3,3'-thiodipropionate, (15) ditetradecyl-3,3'-thiodipropionate, (16) dioctadecyl-3,3'-thiodipropionate, (17) 1,3,5-trimethyl-2,4,6-tris(3,5-di-tert-butyl-4-hydroxy benzyl)benzene, and (18) 2,6-ditert-butyl-4-(dimethylaminomethyl)phenol.

15. A composition in accordance with claim 1 wherein the antistatic agent is selected from the group consisting of (1) monoester sulfosuccinates, (2) diester sulfosuccinates, (3) sulfosuccinamates, (4) ammonium quaternary salts, (5) phosphonium quaternary salts, (6) sulfonium quaternary salts, (7) thiazolium quaternary salt, and (8) benzothiazolium quaternary salts.

16. A composition in accordance with claim 1 wherein the filler is selected from the group consisting of (1) zirconium oxide, (2) colloidal silicas, (3) titanium dioxide, (4) hydrated alumina, (5) barium sulfate, (6) calcium carbonate, (7) high brightness clays, (8) calcium silicate, (9) cellulosics, (10) blend of calcium fluoride and silica, (11) zinc oxide, and (12) blends of zinc sulfide with barium sulfate.

17. A composition in accordance with claim 1 wherein the binder is selected from the group consisting of (1) polyester latex, (2) vinyl chloride latex (3) ethylene-vinyl chloride copolymer emulsions, (4) ethylene-vinylacetate copolymer emulsions, (5) acrylic-vinylacetate copolymer emulsions, (6) styrene-butadiene latexes, (7) butadiene-acrylonitrile-styrene terpolymer latex, (8) starch, (9) gelatin, (10) hydroxypropylmethyl cellulose, (11) sodium carboxymethyl cellulose, (12) hydroxyethyl cellulose, (13) sodium carboxymethyl hydroxyethyl cellulose, (14) hydroxypropyl cellulose, (15) water soluble ethylhydroxyethyl cellulose, (16) methyl cellulose, (17) poly(acrylamide), (18) acrylamide-acrylic acid copolymer, (19) poly(vinyl alcohol), (20) poly(vinyl, pyrrolidone), (21) poly(ethylene oxide), (22) cellulose sulfate, (23) quaternary ammonium copolymers, (24) hydroxyethylmethyl cellulose, (25) cationic hydroxyethyl cellulose, and mixtures thereof.

18. A composition in accordance with claim 1 wherein said defoamer is comprised of a mixture of tetramethyl decanediol and amorphous silica.

19. A composition in accordance with claim 1 wherein said lightfastness promoting agent is 1,1-(1,2-ethane-diyl) bis(3,3,5,5-tetramethyl piperazinone).

* * * * *